US010449916B2

(12) United States Patent
Seger et al.

(10) Patent No.: US 10,449,916 B2
(45) Date of Patent: Oct. 22, 2019

(54) METHOD FOR IMPROVING FUEL ECONOMY BY INFLUENCING DRIVER BEHAVIOR

(71) Applicants: Matthew Seger, Seattle, WA (US); Zachary Slaton, Lynnwood, WA (US)

(72) Inventors: Matthew Seger, Seattle, WA (US); Zachary Slaton, Lynnwood, WA (US)

(73) Assignee: PACCAR INC., Bellevue, WA (US)

( * ) Notice: Subject to any disclaimer, the term of this patent is extended or adjusted under 35 U.S.C. 154(b) by 0 days.

(21) Appl. No.: 15/614,369

(22) Filed: Jun. 5, 2017

(65) Prior Publication Data

US 2018/0345885 A1 Dec. 6, 2018

(51) Int. Cl.
| | | |
|---|---|---|
| *B60R 16/023* | (2006.01) | |
| *G07C 5/08* | (2006.01) | |
| *F02B 77/08* | (2006.01) | |
| *B60W 50/14* | (2012.01) | |
| *B60W 40/09* | (2012.01) | |
| *B60W 50/00* | (2006.01) | |

(52) U.S. Cl.
CPC ........ *B60R 16/0236* (2013.01); *F02B 77/084* (2013.01); *G07C 5/0825* (2013.01)

(58) Field of Classification Search
CPC .. B60R 16/0236; F02B 77/084; G07C 5/0825
USPC ........................................................ 701/123
See application file for complete search history.

(56) References Cited

U.S. PATENT DOCUMENTS

| | | | |
|---|---|---|---|
| 6,092,021 A | * | 7/2000 | Ehlbeck .................... G01L 3/26 701/123 |
| 7,798,578 B2 | | 9/2010 | Lewis et al. |
| 8,116,971 B2 | | 2/2012 | Chen et al. |

(Continued)

FOREIGN PATENT DOCUMENTS

| | | |
|---|---|---|
| EP | 3 000 680 A1 | 3/2016 |
| EP | 3 028 913 A1 | 6/2016 |

(Continued)

OTHER PUBLICATIONS

Feng, L., "Incorporating Driver's Behavior Into Predictive Powertrain Energy Management for a Power-Split Hybrid Electric Vehicle," Open Access Doctoral Dissertation, Michigan Technological University, Houghton, Mich., 2016, >http://digitalcommons.mtu.edu/etdr/83>, 132 pages.

(Continued)

*Primary Examiner* — Atul Trivedi
(74) *Attorney, Agent, or Firm* — Christensen O'Conner Johnson Kindness PLLC

(57) ABSTRACT

A vehicle computer system (e.g., on-board vehicle computer system) obtains a fuel economy performance goal for a vehicle (e.g., an engine speed goal or a vehicle speed goal) that is based on a configuration of the vehicle; calculates a count of events in which a current value exceeds the goal; compares the count of events with a threshold count; and generates one or more notifications based at least in part on the comparison (e.g., for display on an operator interface). The vehicle computer system also calculates an engine speed and a vehicle speed score for a driver of the vehicle based at least in part on comparisons of current speeds with the speed goals. Scoring and other data may be displayed or stored for further processing.

18 Claims, 9 Drawing Sheets

(56) References Cited

U.S. PATENT DOCUMENTS

| | | | |
|---|---|---|---|
| 8,155,868 B1* | 4/2012 | Xing | G07C 5/0808 |
| | | | 340/439 |
| 8,311,722 B2 | 11/2012 | Zhang et al. | |
| 8,738,262 B2 | 5/2014 | Syed et al. | |
| 8,831,825 B2 | 9/2014 | Shah et al. | |
| 8,874,344 B2 | 10/2014 | Aldighieri et al. | |
| 8,970,360 B2 | 3/2015 | Fujiki et al. | |
| 9,050,935 B2 | 7/2015 | Stefan et al. | |
| 9,081,651 B2 | 7/2015 | Filev et al. | |
| 9,135,759 B2 | 9/2015 | Baer et al. | |
| 9,221,452 B2 | 12/2015 | Tang et al. | |
| 9,268,882 B2 | 2/2016 | Slaton et al. | |
| 9,373,203 B1 | 6/2016 | Fields et al. | |
| 9,361,272 B2 | 7/2016 | Syed et al. | |
| 9,522,597 B2 | 12/2016 | Fader et al. | |
| 9,564,065 B2 | 2/2017 | Kwak et al. | |
| 9,646,428 B1* | 5/2017 | Konrardy | H04W 4/90 |
| 10,056,008 B1* | 8/2018 | Sweany | G09B 19/167 |
| 2004/0036601 A1* | 2/2004 | Obradovich | B60C 23/0408 |
| | | | 340/540 |
| 2007/0276582 A1* | 11/2007 | Coughlin | B60W 40/09 |
| | | | 701/123 |
| 2008/0059035 A1* | 3/2008 | Siddiqui | B60K 6/445 |
| | | | 701/93 |
| 2011/0054768 A1* | 3/2011 | Sullivan | B60W 10/06 |
| | | | 701/123 |
| 2012/0022764 A1* | 1/2012 | Tang | B60W 10/06 |
| | | | 701/102 |
| 2012/0065874 A1* | 3/2012 | Sato | B60R 16/0236 |
| | | | 701/123 |
| 2012/0232747 A1 | 9/2012 | Miners et al. | |
| 2014/0162219 A1 | 6/2014 | Stankoulov | |
| 2015/0258996 A1 | 9/2015 | Victor et al. | |
| 2016/0244067 A1* | 8/2016 | Hunt | B60W 40/09 |
| 2018/0075380 A1* | 3/2018 | Perl | G06Q 10/0635 |
| 2018/0075538 A1* | 3/2018 | Konrardy | G06Q 40/08 |

FOREIGN PATENT DOCUMENTS

| | | |
|---|---|---|
| WO | 2007/140232 A2 | 12/2007 |
| WO | 2015/113573 A1 | 8/2015 |

OTHER PUBLICATIONS

Qiao, Z., and O. Karabasoglu, "Vehicle Powertrain Connected Route Optimization for Conventional, Hybrid and Plug-in Electric Vehicles," Submitted to Transportion Research Part D: Transport and Environment; Subjects: Systems and Control, Dec. 5, 2016, <https://arXiv.org/ftp/arXiv/papers/1612/1612.01243.pdf>, 26 pages.

Extended European Search Report dated Oct. 26, 2018, issued in corresponding European Application No. 18175703.0, filed Jun. 4, 2018, 8 pages.

* cited by examiner

METHOD FOR IMPROVING FUEL ECONOMY BY INFLUENCING DRIVER BEHAVIOR

BACKGROUND

Driver coaching and notifications can be helpful for influencing driver behavior. At a basic level, providing a "check engine" light can serve as a helpful reminder to have the vehicle serviced. As another example, U.S. Pre-Grant Publication No. 2012/0232747 states, "When vehicle driving behavior triggers an excessive speed event a coaching tip for this type is queued." According to this publication, "The server 30 is able to track excessive speed events. Excessive speed is defined by multiple parameters configurable by the administrator, including: 1. Speed limit—a system wide configuration applied to all policyholders, i.e., 85.0 MPH." This publication also suggests the following "coaching tip": "A vehicle's fuel efficiency is reduced at speeds greater than the speed limit. Avoid excessive speeds and try to maintain a constant speed." Yet, while mentioning "multiple parameters configurable by the administrator," the "system wide configuration applied to all policyholders" leaves several technical problems unmentioned and unsolved. For example, this approach is "one-size-fits-all" and provides no ability to tailor driver coaching to a particular vehicle or vehicle configuration. This approach fails to recognize that vehicles will have different characteristics that affect fuel economy goals, and fails to provide any technical framework for solving such problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a vehicle computer system (e.g., an on-board vehicle computer system) comprises at least one processing unit and a memory having stored therein computer-executable instructions configured to cause the vehicle computer system to obtain a fuel economy performance goal for a vehicle, calculate a count of events in which a current value exceeds the fuel economy performance goal, perform a comparison of the count of events with a threshold count; and generate one or more notifications based at least in part on the comparison. The fuel economy performance goal is based at least in part on a configuration of the vehicle, and may be an engine speed goal or a vehicle speed goal. For an engine speed goal, the vehicle computer system may calculate an engine speed score for a driver of the vehicle. The engine speed goal may be based at least in part on a peak torque engine speed for the vehicle. For a vehicle speed goal, the vehicle computer system may calculate a vehicle speed score for a driver of the vehicle. The vehicle computer system may include an operator interface on which the notifications are displayed.

In another aspect, the vehicle computer system obtains fuel-economy performance goals (e.g., an engine speed goal and a vehicle speed goal) for a vehicle, compares a current engine speed with an engine speed goal, calculates an engine speed score for a driver of the vehicle based at least in part on the comparison of the current engine speed with the engine speed goal, compares a current vehicle speed with a vehicle speed goal, calculates a vehicle speed score for the driver of the vehicle based at least in part on the comparison of the current vehicle speed with the vehicle speed goal, and outputs the engine speed score and the vehicle speed score. At least one of the fuel economy performance goals is based at least in part on a configuration of the vehicle. The vehicle computer system may generate representations of the engine speed score and the vehicle speed score for display on an operator interface. The vehicle computer system may calculate a combined score for a driver of the vehicle based at least in part on the engine speed score and the vehicle speed score. The combined score may be further based on other factors, such as cruise control usage. The vehicle computer system may generate a representation of the combined score for display on an operator interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
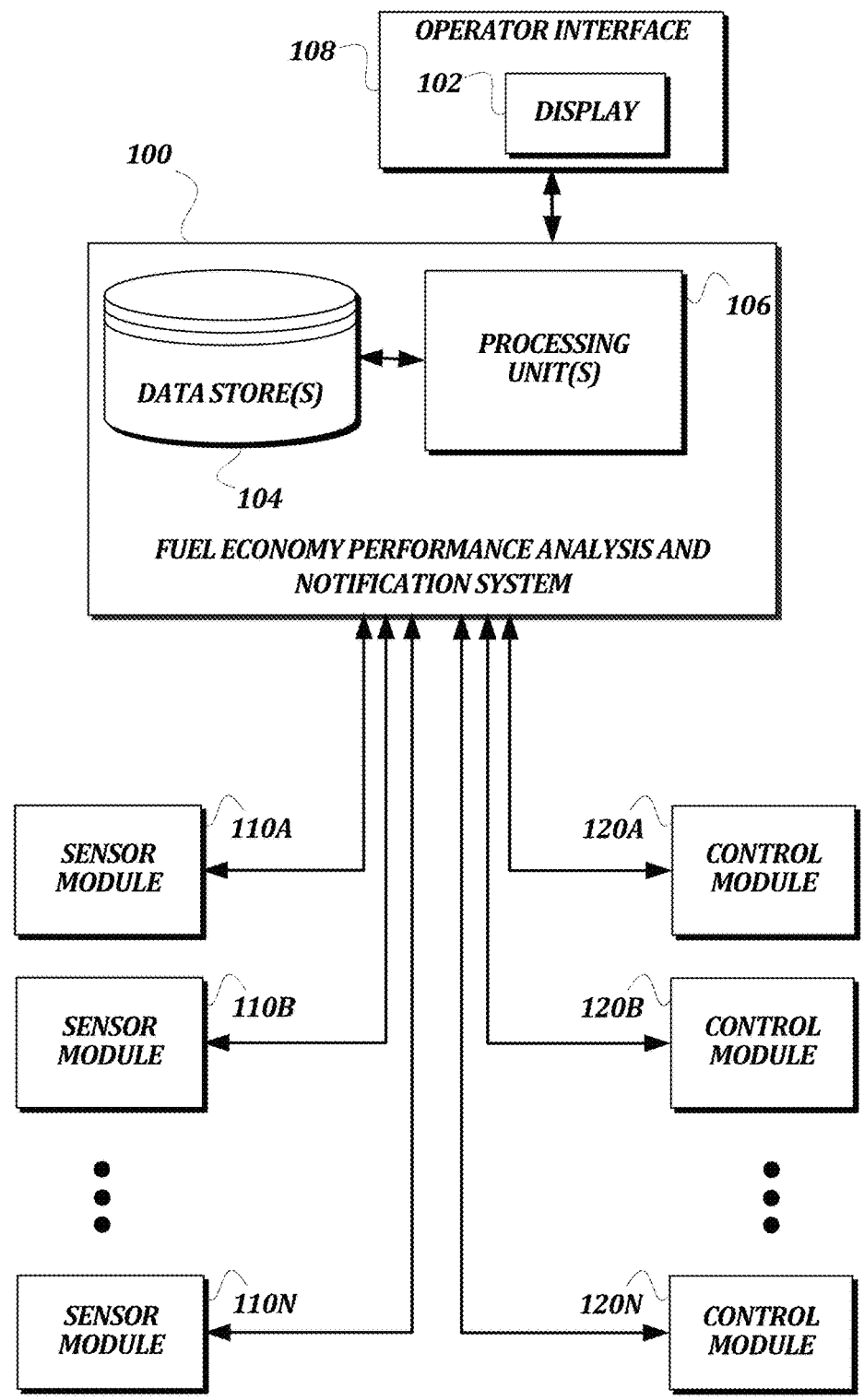
FIG. 1 is a schematic diagram of an illustrative on-board vehicle computing system in which a fuel economy performance analysis and notification system may be implemented according to at least one embodiment of the present disclosure.

The detailed description set forth below in connection with the appended drawings is an illustrative and non-limiting description of various embodiments of the disclosed subject matter. The following description proceeds with reference to examples of systems and methods suitable for use in or with vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

In described embodiments, a fuel economy performance analysis and notification system uses configuration information and driver performance information to analyze fuel economy performance and provide related notifications. Such notifications may be used to influence driver behavior. Techniques and systems described herein may be used to improve fuel economy by, e.g., influencing drivers to operate the vehicle at a target vehicle speed or engine speed for a specific vehicle configuration.

For example, an engine speed score (e.g., an instantaneous score or an overall score that is updated over time) can be calculated based on actual operating conditions relative to an engine speed goal. As another example, an instantaneous or overall vehicle speed score can be calculated based on actual operating conditions relative to a vehicle speed goal. The engine speed goal or vehicle speed goal can be determined based on the vehicle's configuration and operating conditions. The engine speed and vehicle speed goals preferably promote improved fuel economy and may be set as, e.g., the vehicle's most fuel efficient engine speed or vehicle speed for its configuration at highway speeds. Drivers operating at inefficient speeds may receive feedback aimed at correcting this behavior, while drivers operating at or near the speed goals may receive feedback aimed at informing them of good performance.

The fuel economy performance analysis and notification system can generate notifications in the form of visual cues such as diagrams, text, icons, and the like can be used to communicate truck status, suggested actions, and other information. Such notifications can be used to encourage particular operator behavior, e.g., to improve fuel economy. The system can allow operator or owner control of some features and settings (e.g., to reduce or increase the amount of information or frequency of feedback).

The content and frequency of feedback supplied to the operator is scalable based on factors such as an operator's driving performance and adjustable settings, and is provided in an intuitive manner so as to minimize operator distractions. For example, a count of events in which a current value (e.g., an engine speed or vehicle speed) exceeds the fuel-economy performance goal can be maintained and compared with a threshold count to determine whether to remind an operator to reduce engine speed or vehicle speed. Described embodiments allow customized experiences for operators with different preferences and levels of experience. For example, the system can present a reduced amount of information to higher-performing operators to minimize distractions, and the system can present more information to lower-performing or less experienced operators to enable operators or owners to reap greater fuel economy benefits from the fuel economy performance analysis and notification system.

Configuration information can be used to set engine speed and vehicle speed goals. Configuration information can be obtained from a processed vehicle order (e.g., during an initial configuration stage after a vehicle is purchased) or in some other way. Fuel-economy performance goals can be revised, e.g., to suit particular performance needs or fuel economy goals.

Illustrative Operating Environment

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. A controller area network (CAN) bus can be used to communicate vehicle operating conditions as specified by the Society of Automotive Engineers (SAE) J1939 standard. However, as innovations in vehicle network communications continue, it is to be understood that other bus and network designs or communication protocols also can be used within the scope of the present disclosure.

FIG. 1 illustrates one embodiment of a vehicle computer system including a fuel economy performance analysis and notification system 100 according to various aspects of the present disclosure. In the example shown in FIG. 1, the system 100 includes one or more processing units (e.g., electronic control units (ECUs)) 106 that analyze fuel economy performance and generate operator notifications. The system 100 communicates with an operator interface 108 comprising a display 102. The display 102 may be any type of display used in a vehicle to convey information (e.g., driver tips or other notifications) to the operator. For example, the display 102 may include an LCD display configured to display information to the operator. The display 102 also may provide other information related to the operator, or the truck or its environment. The operator display 102 may include special purpose lighted displays, needle gauges, and/or the like. The operator interface 108 also may include other output devices such as speakers or haptic feedback devices to provide information to the operator. In a touchscreen configuration, the operator display 102 may have input capabilities. The operator interface 108 also may include other input devices including buttons, toggles, keyboards, mechanical levers, and any other devices that allow an operator to provide input to the system 100 or other systems of the vehicle.

It will be appreciated that the processing units 106 can be implemented in a variety of hardware, software, and combination hardware/software configurations, for carrying out aspects of the present disclosure. The processing units 106 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor. The memory may include program instructions that implement functionality of the system 100. Alternatively, such instructions may be stored in other storage or in other locations.

The processing units 106 are communicatively coupled to one or more data stores 104, which may include data such as vehicle operation data, vehicle configuration data, and fuel economy performance data. The data store 104 includes a computer-readable storage medium. Any suitable computer-readable storage medium, such as an EEPROM, flash memory, hard disk, or the like may be used. The data is used by the system 100, as described herein, to perform one or more of the functions described herein. For example, the description makes reference to vehicle data that can be sensed and stored during vehicle operation, as well as programmable settings that can be programmed by the vehicle manufacturer, the owner, the operator, or any other suitable entity.

In the example shown in FIG. 1, the system 100 is communicatively coupled to a plurality of sensors 110A-110N that provide information concerning the status of the vehicle. For example, the system 100 may be communicatively coupled to a vehicle speed sensor module, an engine speed sensor module, or other sensor modules that relate to fuel economy performance analysis. The sensor modules described herein are only examples, and the present disclosure is not limited the specific sensor modules described herein.

The system 100 is also communicatively coupled to a plurality of vehicle performance control modules 120A-120N for controlling various functions of the vehicle. For example, the system 100 may be communicatively coupled to modules that electronically control vehicle speed, engine speed, or other more specialized functions such as cruise control. The vehicle performance control modules described herein are only examples, and the present disclosure is not limited to the specific vehicle performance control modules described herein.

Components described herein may be communicatively coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed communication systems without departing from the scope of the claimed subject matter.

The system 100 may be implemented in an on-board vehicle computer system or in some other configuration. Although some examples described herein relate to on-board vehicle computer systems, such examples may be extended to involve computer systems that are not on board a vehicle. For example, a suitably equipped vehicle may communicate with other computer systems wirelessly, e.g., via a WiFi or cellular network. Such systems may provide remote data processing and storage services, remote diagnostics services, driver training or assistance, or other services. In such an embodiment, the system 100 may be implemented in one or more computing devices that communicate with but are separate from, and potentially at a great distance from the vehicle.

Illustrative Fuel Economy Performance Analysis and Notification System

This section describes an illustrative fuel economy performance analysis and notification system 100 that may be implemented in the on-board vehicle computing system of FIG. 1 or in some other computing system. Although illustrative details are provided in this section, it should be understood that alternative systems and methods can be implemented and used in accordance with the present disclosure.

Figure 2:
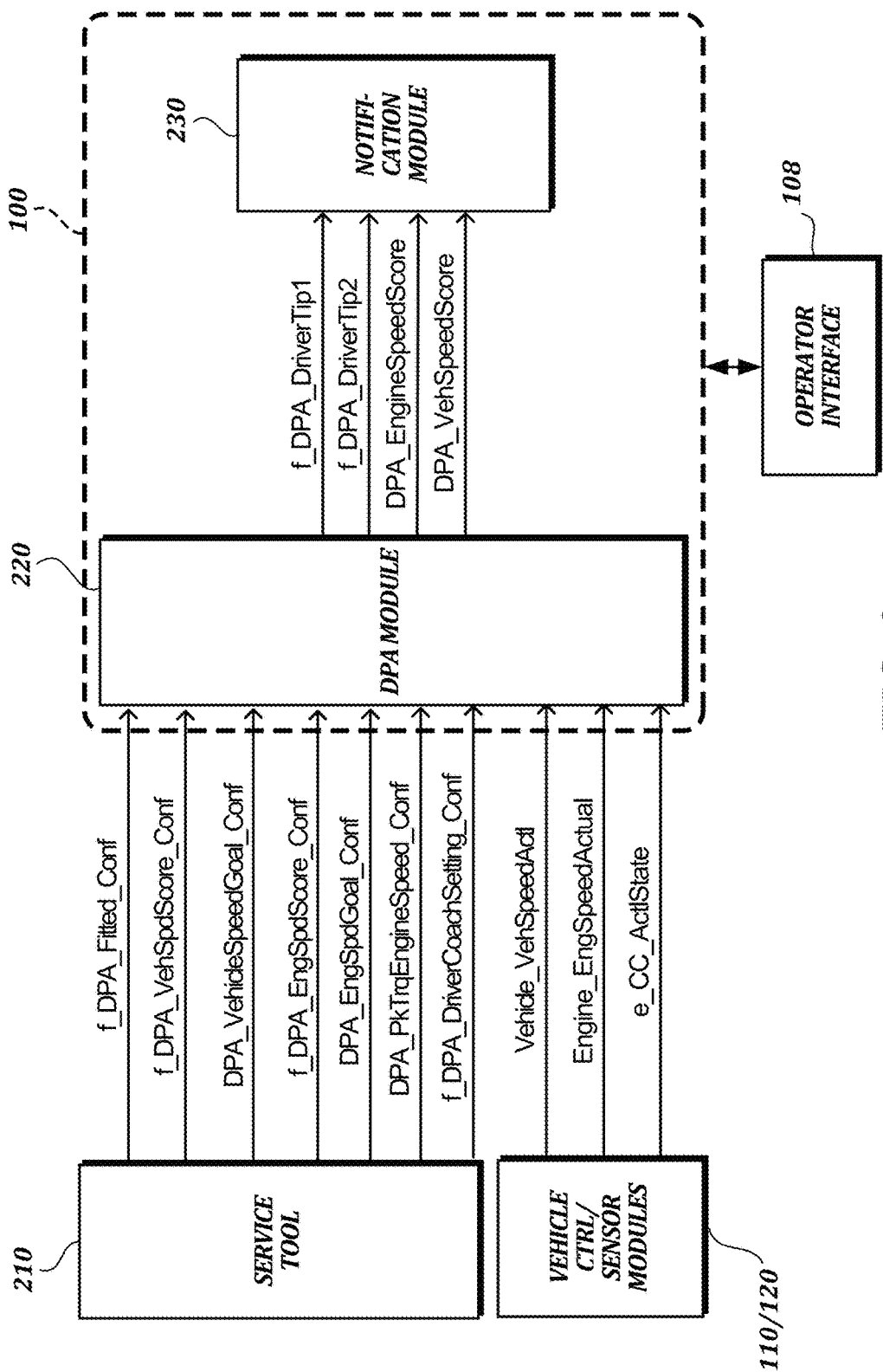
FIG. 2 is a schematic diagram of a fuel economy performance analysis and notification system that may be implemented by a computing system such as the on-board vehicle computing system of FIG. 1.

In the example shown in FIG. 2, the system 100 includes a driver performance assistant (DPA) module 220 and a notification module 230. The DPA module 220 and notification module 230 may be implemented in one or more ECUs or other processing units. The system 100 receives signals that provide vehicle and system configuration information and vehicle operation information.

In this example, the vehicle and system configuration information is received from a service tool 210, and the vehicle operation information is received from vehicle control modules 120 and/or vehicle sensor modules 110. The service tool 210 may connect to an on-board vehicle computer system via the CAN bus. Alternatively, vehicle and system configuration information can be provided in some other way or by some other device, such as a remote computer communicating wirelessly with the system 100. Vehicle operation data, vehicle configuration data, and fuel economy performance data may be stored in one or more data stores, such as data stores within the DPA module 220 or elsewhere within or outside of the system 100.

As shown in FIG. 2, illustrative vehicle configuration information provided to the system 100 may include signals that indicate whether the DPA module or particular features (e.g., vehicle speed scoring, engine speed scoring, driver coaching) have been activated (e.g., by a vehicle owner). Such vehicle configuration information also may include a vehicle speed goal, an engine speed goal, and an engine speed where the engine receives peak torque. Illustrative signals to provide vehicle operation information to the system 100 may include current vehicle speed and current engine speed, as well as other information that may affect driver performance scoring or driver coaching, such as cruise control information.

In the example shown in FIG. 2, illustrative signals (which are described in further detail in Tables 1 and 2, below) are received as input in DPA module 220.

TABLE 1

Illustrative vehicle configuration and system configuration signals.

| Signal | Unit/Type | Description |
|---|---|---|
| f_DPA_Fitted_Conf (Enable DPA) | Boolean | Boolean value indicating whether DPA functionality has been enabled. |
| f_DPA_VehSpdScore_Conf (Enable Vehicle Speed Score) | Boolean | Boolean value indicating whether vehicle speed scoring functionality of the DPA module has been enabled. |
| DPA_VehicleSpeedGoal_Conf (Vehicle Speed Goal) | [mph] | Indicative of a target highway vehicle speed for the given vehicle configuration. |
| f_DPA_EngSpdScore_Conf (Enable Engine Speed Score) | Boolean | Boolean value indicating whether Engine Speed Scoring functionality of the DPA module has been enabled. |

TABLE 1-continued

Illustrative vehicle configuration and system configuration signals.

| Signal | Unit/Type | Description |
|---|---|---|
| DPA_EngSpdGoal_Conf (Engine Speed Goal) | [RPM] | Indicative of a target engine speed (e.g., an engine speed at which the truck is configured to operate most efficiently) as a function of Peak Torque Engine Speed (see below) and drivability. |
| DPA_PkTrqEngineSpeed_Conf (Peak Torque Engine Speed) | [RPM] | Indicative of the speed at which the engine can produce its peak torque. |
| f_DPA_DriverCoachSetting_Conf (Enable Driver Coaching) | Boolean | Boolean value indicating whether the driver coaching functionality (e.g., driver tips) of the DPA has been enabled. |

TABLE 2

Illustrative vehicle operation and vehicle status signals.

| Signal | Unit/Type | Description |
|---|---|---|
| Vehicle_VehSpeedActl | [mph] | Indicative of the actual vehicle speed |
| Engine_EngSpeedActual | [RPM] | Indicative of the actual engine speed |
| e_CC_ActlState (Cruise Control State) | Boolean | Indicative of the cruise control state |

The system 100 also generates signals. In the example shown in FIG. 2, DPA module 220 provides output signals to the notification module 230. Illustrative signals generated by the system 100 may include Boolean signals that indicate whether driver tips are to be presented via the operator interface 108 to encourage a change in behavior, or that indicate whether compliments are to be presented. Such signals also may include more detailed scoring information (e.g., vehicle speed score, engine speed score). Illustrative signals that may be generated by the system 100 (e.g., by the DPA module) are described in further detail in Table 3, below.

TABLE 3

Illustrative signals generated by DPA module.

| Signal | Unit/Type | Description |
|---|---|---|
| f_DPA_DriverTip1 | Boolean | Indicates tip to be provided to the driver regarding operating engine speed. |
| f_DPA_DriverTip2 | Boolean | Indicates tip to be provided to the driver regarding operating vehicle speed. |
| DPA_EngineSpeedScore (Engine Speed Score) | [score 0-100] | Value for the Engine Speed Score. |
| DPA_VehSpeedScore (Vehicle Speed Score) | [score 0-100] | Value for the Vehicle Speed Score. |

Vehicle Speed Analysis

This section describes illustrative approaches to fuel economy performance analysis with respect to vehicle speed.

Vehicle speed analysis may involve vehicle speed scoring, e.g., for a particular driver. In at least one embodiment, vehicle speed scoring within the DPA can be activated when the following conditions are met:
1. Vehicle speed is greater than a predetermined minimum speed; and
2. Enable Vehicle Speed Score=TRUE.

Conversely, vehicle speed scoring can be deactivated when the actual vehicle speed is less than the predetermined minimum speed, or when Enable Vehicle Speed Score=FALSE. This allows the driver to be scored at speeds that have greater impact on fuel economy, and also allows vehicle speed scoring to be generally disabled when such scoring is not found to be desirable or useful in particular scenarios. Other sets of conditions also can be used.

Referring again to FIG. 2, DPA_VehSpeedScore (Vehicle Speed Score) is an output of the DPA module that communicates the score based on the vehicle speed in relation to its Vehicle Speed Goal (DPA_VehicleSpeedGoal_Conf). In at least one embodiment, the Vehicle Speed Score is constrained to a value between 0 and 100. In this way, if use of particular equations leads to negative values or values over 100, those values can be constrained to provide consistent driver feedback. Alternatively, other constraints may be used. In at least one embodiment, the score can be reset upon receiving a DPA Reset command, which instructs the DPA module to reset cumulative scores within it.

The Vehicle Speed Score may be active or inactive depending on vehicle conditions. Generally speaking, the Vehicle Speed Score is intended to be active when the vehicle is primarily being used for high speed driving on a highway, where aerodynamic losses have a greater effect on fuel economy. Therefore, in at least one embodiment, the Vehicle Speed Score is active when the actual vehicle speed is greater than a predetermined minimum speed.

In at least one embodiment, the Vehicle Speed Score starts at a default value (e.g., 50) and can be updated. For example, updates to Vehicle Speed Score can occur when engine speed is measured after a particular distance has been traveled (Distance_Change_Vehicle_Speed). Thus, the driver may start with what is considered an average or default Vehicle Speed Score and will be able to add to it or subtract from it based on their Scored Vehicle Speed. This provides a dynamic Vehicle Speed Score that is indicative of their overall vehicle speed habits.

The Scored Vehicle Speed can take different values depending on vehicle conditions. In one illustrative scenario, the Scored Vehicle Speed is equal to the Cruise Control Set Speed when Cruise Control State=ACTIVE. This condition is based on the rationale that a driver should not be penalized when cruise control overshoots or undershoots its Cruise Control Set Speed and should be encouraged to use cruise control. In other illustrative scenarios, such as when cruise control is inactive, the Scored Vehicle Speed is equal to the actual vehicle speed.

In at least one embodiment, each Vehicle Speed Score update involves adding the following term to the last calculated Vehicle Speed Score:

$$\text{Fuel\_Economy\_Improvement\_Vehicle\_Speed} * \text{Distance\_Change\_Vehicle\_Speed} * k,$$

where k is a predetermined value. Fuel_Economy_Improvement_Vehicle_Speed is indicative of the fuel economy improvement as a function of the aerodynamic drag losses that a vehicle experiences over a measured distance due to its vehicle speed. Alternatively, other equations or relationships can be used.

Figure 3:
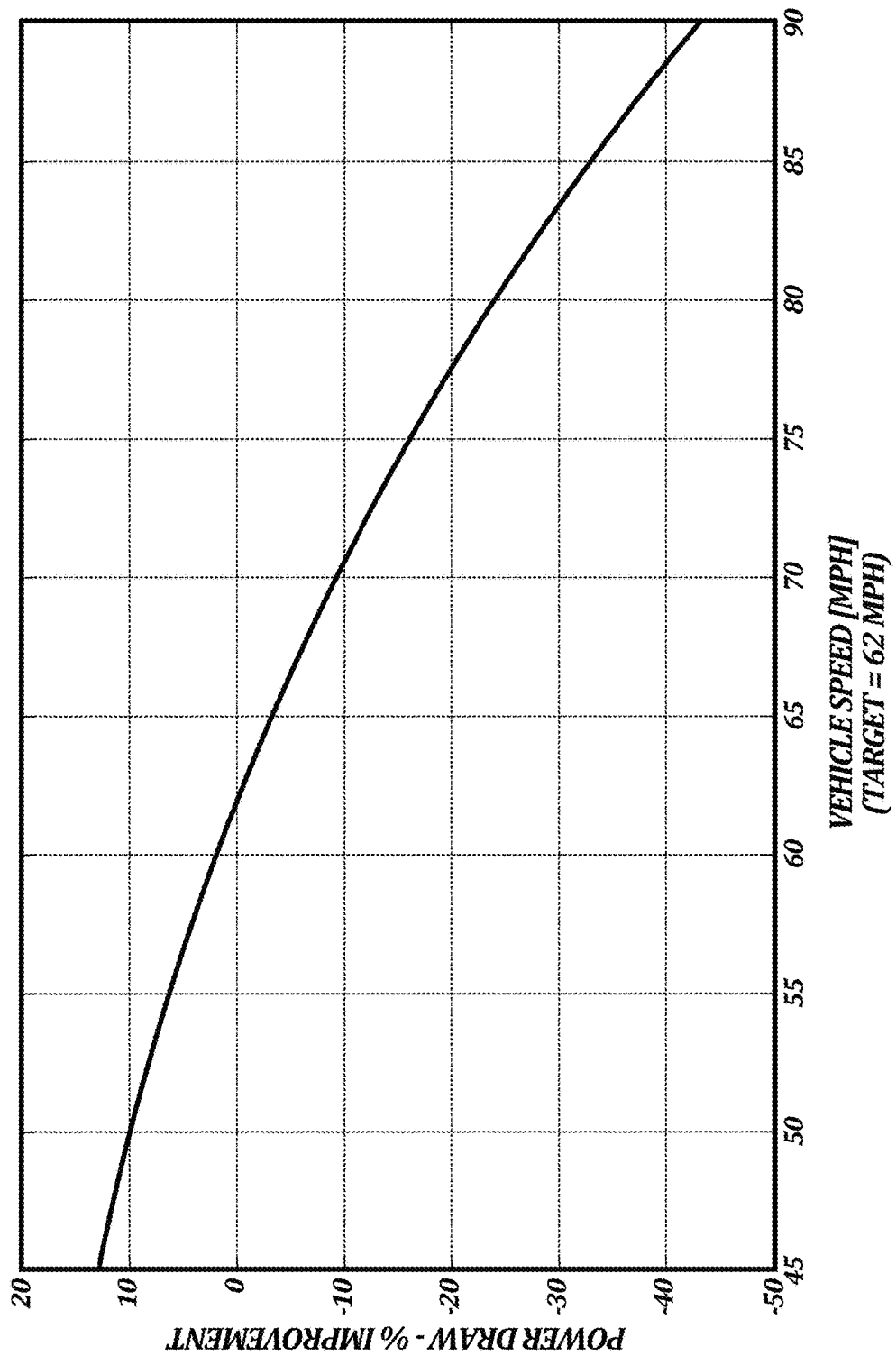
FIG. 3 is a graph that provides a visual representation of fuel economy improvement as a function of vehicle speed in relation to a vehicle speed goal according to at least one embodiment of the present disclosure.

In at least one embodiment, Fuel_Economy_Improvement_Vehicle_Speed is calculated as follows:

$$\text{Fuel\_Economy\_Improvement\_Vehicle\_Speed} = [(\text{Vehicle Speed Goal} + \text{a predetermined value})^3 - \text{Average\_Vehicle\_Speed}^3]/(\text{Vehicle Speed Goal} + \text{a predetermined value})^3,$$

where Average_Vehicle_Speed is the average value of Scored Vehicle Speed over the time period corresponding to Distance_Change_Vehicle_Speed during vehicle speed scoring. This equation relates the driver's Scored Vehicle Speed relative to the Vehicle Speed Goal directly to fuel economy improvement via reduction of aerodynamic drag. The predetermined value is to ensure the driver gains points by operating at the Vehicle Speed Goal. Note that in this example, each term on the right hand side of the equation is raised to the third power. This equation is visualized in FIG. 3, which provides a visual representation of fuel economy improvement as a function of vehicle speed in relation to the Vehicle Speed Goal. As shown in FIG. 3, the fuel economy improvement line crosses the 0% line at an illustrative Vehicle Speed Goal of 62 mph. Alternatively, other equations or relationships can be used.

In at least one embodiment, if following set of conditions has been met for a predetermined length of time, a Vehicle Speed Tip Count is incremented:
 1. Vehicle Speed Score=ACTIVE; and
 2. Actual vehicle speed is greater than (Vehicle Speed Goal+the adjustable offset value).
However, other sets of conditions also can be used.

In at least one embodiment, a vehicle speed notification is generated (e.g., instructing or encouraging the driver to operate at a lower vehicle speed to improve fuel economy), when driver coaching is enabled (Enable_Driver_Coaching=ON) and the Vehicle Speed Tip Count is equal to a predetermined threshold. Referring again to FIG. 2, when these conditions are met the DPA module 220 may generate and transmit a signal such as f_DPA_DriverTip1 to the notification module 230 to initiate generation of an appropriate notification (e.g., for display at the operator interface 108). This approach allows the driver to be notified if the actual vehicle speed is greater than the Vehicle Speed Goal plus the offset value, indicating poor fuel economy performance. Other sets of conditions also can be used. Illustrative vehicle speed notifications are described in further detail below.

Once the Vehicle Speed Tip Count has been incremented to the point where a vehicle speed tip is generated, the Vehicle Speed Tip Count is reset to 0, and further incrementing can occur depending on operating conditions. The Vehicle Speed Tip Count also can be reset to 0 when certain conditions are met prior to a vehicle speed tip being generated, such as when the vehicle speed drops to or below the Vehicle Speed Goal.

Engine Speed Analysis

This section describes illustrative approaches to fuel economy performance analysis with respect to engine speed.

Engine speed analysis may involve engine speed scoring, e.g., for a particular driver. In at least one embodiment, Engine Speed Scoring within the DPA is activated when the following conditions are met:
 1. Vehicle speed is greater than an adjustable minimum speed; and
 2. Enable Engine Speed Score=TRUE.
However, other sets of conditions also can be used.

Referring again to FIG. 2, DPA_EngineSpeedScore (Engine Speed Score) is an output of the DPA module that communicates the score based on the engine speed in relation to its Engine Speed Goal (DPA_EngSpdGoal_Conf). In at least one embodiment, the score can be reset upon receiving a DPA Reset command, which instructs the DPA module to reset cumulative scores within it.

In at least one embodiment, the Engine Speed Score starts at a default value (e.g., 50) and can be updated. For example, updates to Engine Speed Score can occur when engine speed is measured after a particular distance has been traveled (Distance_Change_Engine_Speed). Thus, the driver may start with what is considered an average or default Engine Speed Score and will be able to add to it or subtract from it based on their Scored Engine Speed. This provides a dynamic Engine Speed Score that is indicative of their overall engine speed habits.

The Scored Engine Speed can take different values depending on vehicle conditions. In one illustrative scenario, the Scored Engine Speed is equal to the engine speed necessary to produce the Cruise Control Set Speed in the current gear. One equation that can be used to meet this requirement is Scored_Engine_Speed=Cruise_Control_Set_Speed*Rear_Axle_Ratio*Transmission_Gear_Ratio*Tire_Size/60, but other implementation strategies also may be used. In at least one embodiment, this is done when the following conditions are met:
 1. Cruise Control State=ACTIVE;
 2. PST_Hold_Gear=FALSE; and
 3. Accelerator_Pedal=RELEASED.

The first and third conditions are based on the rationale that a driver should not be penalized when cruise control causes the engine to overshoot or undershoot its Engine Speed Goal and should be encouraged to use cruise control. The second condition applies to vehicles having Predictive Shift and Torque (PST) functionality.

In another illustrative scenario, the Scored Engine Speed is equal to the Engine Speed Goal when the following conditions are met:
 1. Cruise Control State=ACTIVE;
 2. PST_Hold_Gear=TRUE; and
 3. Accelerator_Pedal=RELEASED.

In this case, the second condition is based on the rationale that a driver should not be penalized when PST temporarily causes the vehicle to operate at a high engine speed by inhibiting a shift. However, many alternative sets of conditions are possible.

In other illustrative scenarios, such as when cruise control is inactive or the accelerator pedal is being applied, the Scored Engine Speed is equal to the actual engine speed. These conditions are based on the rationale that when cruise control is not controlling the engine speed requests, or when the accelerator pedal is being used to control the engine speed request, the driver should be scored on their actual engine speed.

In at least one embodiment, each Engine Speed Score update involves adding the following term to the last calculated Engine_Speed_Score:

$$\text{Fuel\_Economy\_Improvement\_Engine\_Speed} * \text{Distance\_Change\_Engine\_Speed} * k,$$

where k is a predetermined value. This equation relates the driver's fuel economy improvement due to engine speed over a measured distance to their Engine Speed Score.

Fuel_Economy_Improvement_Engine_Speed is indicative of the fuel economy improvement as a function of engine speed relative to the Engine Speed Goal and Peak Torque Engine Speed. Alternatively, other equations or relationships can be used.

Figure 4:
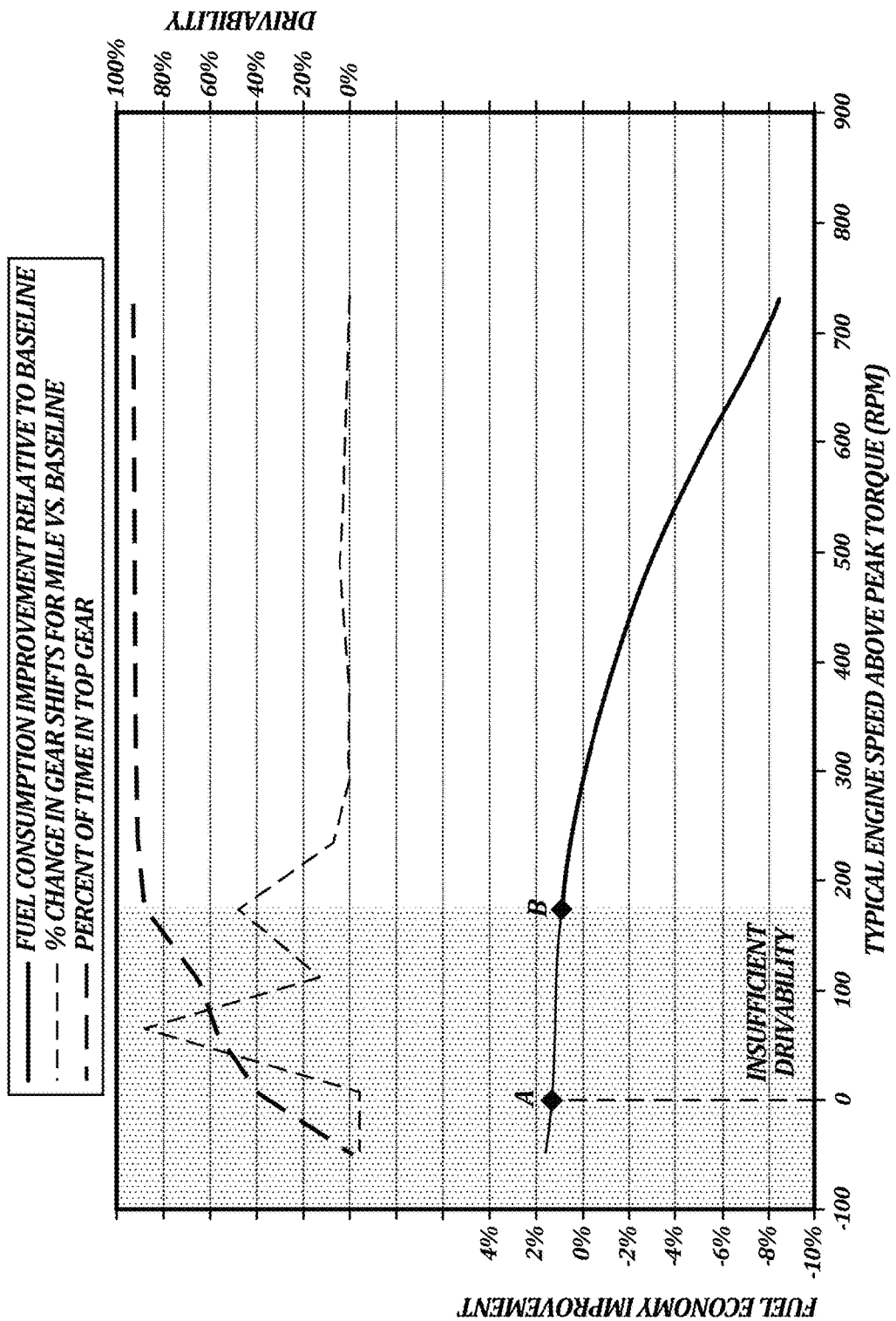
FIG. 4 depicts a peak torque engine speed at an engine speed goal in a graph that relates fuel economy improvement to engine speed according to at least one embodiment of the present disclosure.

This relationship is illustrated in FIG. 4, in which point A represents the Peak Torque Engine Speed, and point B represents the Engine Speed Goal. (The details of the mapping shown in FIG. 4 will vary for different engines or configurations that may have, for example, different peak torque engine speeds and engine speed targets.) As shown in FIG. 4, when the Scored Engine Speed is equal to the Engine Speed Goal fuel economy is improved (with point B above the 0% line on the y axis). In this example, when the Scored Engine Speed is equal to the Engine Speed Goal, the operator will receive points towards their Engine Speed Score. The Engine Speed Goal can be a predetermined value, and can be set closer to or further away from the 0% line to award points at different levels of fuel economy improvement.

In at least one embodiment, the Engine Speed Goal is set at a predefined target that is higher than the Peak Torque Engine Speed, but at a point where fuel economy still improves. Drivability may also be considered in setting the Engine Speed Goal. An example of this is shown in FIG. 4, where the Engine Speed Goal is set at a point where fuel economy improves and drivability is also at an acceptable level.

In at least one embodiment, the Engine Speed Score is constrained to a value between 0 and 100. In this way, if use of particular equations leads to negative values or values over 100, those values can be constrained to provide consistent driver feedback. Alternatively, other constraints may be used.

The Engine Speed Score may be active or inactive depending on vehicle conditions. There may be times when it is not helpful to score engine speed performance, such as when the driver is in stop-and-go traffic. Generally speaking, the Engine Speed Score is intended to be active when the vehicle is primarily being used for high speed driving on a highway. In at least one embodiment, the Engine Speed Score is active when the following conditions are met:
1. Engine_State=DRIVING;
2. Driveline_State=CLOSED; and
3. Transmission_Gear_Ratio is less than or equal to an adjustable minimum value (e.g., 1:1).

In at least one embodiment, the Engine Speed Score may be inactive when any of the following conditions are met:
1. Engine_State≠DRIVING;
2. Driveline_State=OPEN; or
3. Transmission_Gear_Ratio is greater than the adjustable minimum value.

These conditions are based on the rationale that engine speed would not normally be scored unless the engine is being used for driving, that the driver should not be scored during gear shifts with a manual transmission, and that the driver should not be scored at higher gear ratios. However, many alternative sets of conditions are possible.

For example, the engine state condition may involve a determination as to whether the engine state is RUNNING, rather than DRIVING. As another example, an additional condition of a minimum actual vehicle speed or a minimum requested vehicle speed may be used to ensure that engine speed scoring is only performed at highway speeds.

In at least one embodiment, if the following set of conditions has been met for a predetermined length of time, the Engine Speed Tip Count is incremented:

1. Engine Speed Score=ACTIVE; and
2. Actual engine speed is greater than (Engine Speed Goal+the adjustable offset value).

However, many alternative sets of conditions are possible.

In at least one embodiment, an engine speed notification is generated (e.g., instructing or encouraging the driver to operate at a lower engine speed to improve fuel economy), when driver coaching is enabled (Enable_Driver_Coaching=ON) and the Engine Speed Tip Count is equal to a predetermined threshold. Referring again to FIG. 2, when these conditions are met the DPA module 220 may generate and transmit a signal such as f_DPA_DriverTip2 to the notification module 230 to initiate generation of an appropriate notification (e.g., for display at the operator interface 108). This approach allows the driver to be notified if the actual vehicle speed is greater than the Engine Speed Goal plus the offset value, indicating poor fuel economy performance. Other sets of conditions also can be used. Illustrative engine speed notifications are described in further detail below.

Once the Engine Speed Tip Count has been incremented to the point where an engine speed tip is generated, the Engine Speed Tip Count is reset to 0, and further incrementing can occur depending on operating conditions. The Engine Speed Tip Count also can be reset to 0 when certain conditions are met prior to an engine speed tip being generated, such as when the engine speed drops to or below the Engine Speed Goal.

Combination Scoring

This section describes illustrative approaches to combined performance scoring involving engine speed and vehicle speed performance. This allows for a broader approach in which performance scoring such as engine speed scoring and vehicle speed scoring are not viewed in isolation but in a combined way, and potentially involving other performance factors, as well.

For example, a Throttle On Score may provide a combined score (e.g., by averaging or adding together weighted or unweighted component scores). Throttle On Score may encompass scoring for multiple throttle-on behaviors, such as Engine Speed Score, Vehicle Speed Score, and a Cruise Control Bonus, or some combination of these or other component scores. In at least one embodiment, Throttle On Score is calculated according to the following equation:

$$\text{Min}[((\text{Engine\_Speed\_Score}*\text{Engine\_Speed\_Weight})+ (\text{Vehicle\_Speed\_Score}*\text{Vehicle\_Speed\_Weight})+ \text{Cruise\_Control\_Bonus}),100]$$

In the illustrative equation above, the Throttle On Score will be constrained between 0 and 100. The individual scores may be weighted based on their relative impact on overall fuel economy, and such weighting factors can be adjusted. Engine Speed Weight represents the weighting that Engine Speed Score receives (e.g., 0.3449 or some other weighting factor), Vehicle Speed Weight represents the weighting that Vehicle_Speed_Score receives (e.g., 0.6551 or some other weighting factor), and Cruise Control Bonus represents a score based on the driver's use of cruise control. Alternatively, other equations or relationships can be used.

Referring again to FIG. 2, the Cruise Control Bonus may be scored by the DPA module 220. Like other scoring described herein, Cruise Control Bonus may not always be active. An owner or operator may have the option to disable Cruise Control Bonus. If Cruise Control Bonus is enabled, it may not always be active. In at least one embodiment, Cruise Control Bonus is active when cruise control is active, but is not active when cruise control is not active. In addition, a check may be performed to determine whether cruise control is possible or desirable. In at least one embodiment, Cruise Control Bonus is not active unless cruise control activation is deemed possible (e.g., Cruise_Control_Possible=TRUE) when the following conditions are met:

1. Vehicle speed is greater than a predetermined threshold; and
2. Vehicle speed remains relatively constant (e.g., within a predetermined range of a cruise control baseline speed) for a predetermined period of time.

These conditions are based on the rationale that when the vehicle speed does not remain above a certain threshold and relatively constant for a period of time, it is indicative of traffic or road conditions that are not conducive to cruise control use. In such situations, it may not be desirable to score a driver's use of cruise control. However, many alternative sets of conditions are possible.

Illustrative Operator Interface and Notifications

As explained above, a fuel economy performance analysis and notification system can generate notifications in the form of visual cues such as diagrams, text, icons, and the like to communicate truck status, suggested actions, and other information. Such notifications can be used to encourage particular operator behavior, e.g., to improve fuel economy. Referring again to FIG. 2, notifications can be generated by the notification module 230 in response to information received from the DPA module 220, and transmitted to the operator interface 108. Example notifications are described in detail below.

In any of the examples described herein, the content, appearance, or presence of notifications or other features of an operator interface may depend on operator or owner preferences, system settings, or other factors. The visual and functional elements described in the following examples can be replaced with any other elements that are suitable for communicating the information described in these examples, or other information that may be relevant to the techniques and systems described herein. Further, the elements described in the following examples can be presented in different ways (e.g., in different colors, sizes, or display locations; animated or static; flashing or not flashing; flashing at different rates; with or without sound; movable (e.g., by an operator interacting with a touchscreen) or in a fixed location; etc.) to communicate the information described in these examples.

Depending on implementation, one or more visual elements may be activated (e.g., by touch in a touch-enabled interface) to access additional information or functionality. Notifications may be displayed for a defined period of time or until a particular event occurs. As an example, an engine speed tip may be displayed for a defined period of time (e.g., a few seconds) or until engine speed is reduced below a target engine speed.

Figure 5:
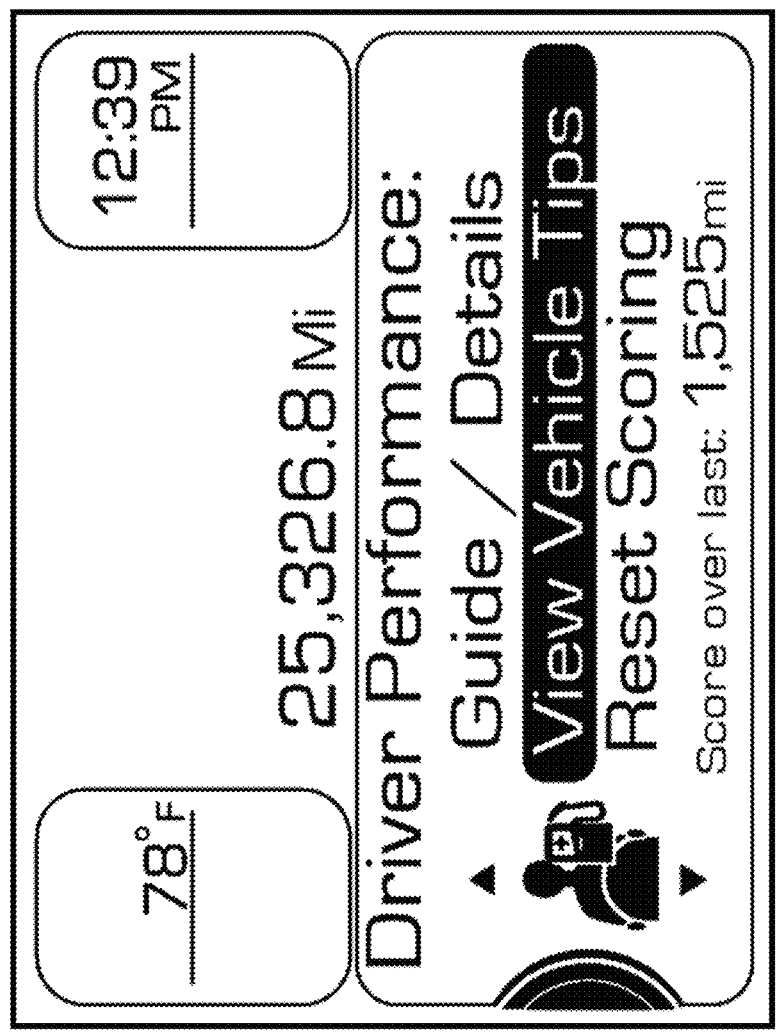
FIG. 5 is an illustrative screen shot of an operator interface that provides information and options relating to driver performance and scoring according to at least one embodiment of the present disclosure.

FIG. 5 depicts an illustrative operator interface that provides the ability to view details or adjust settings relating to driver performance tips and scoring (e.g., engine speed tips and scoring, vehicle speed tips and scoring, or other tips or scoring). A menu for viewing vehicle tips, accessing a help guide or other details, and resetting scoring is provided along with other information.

Figure 6:
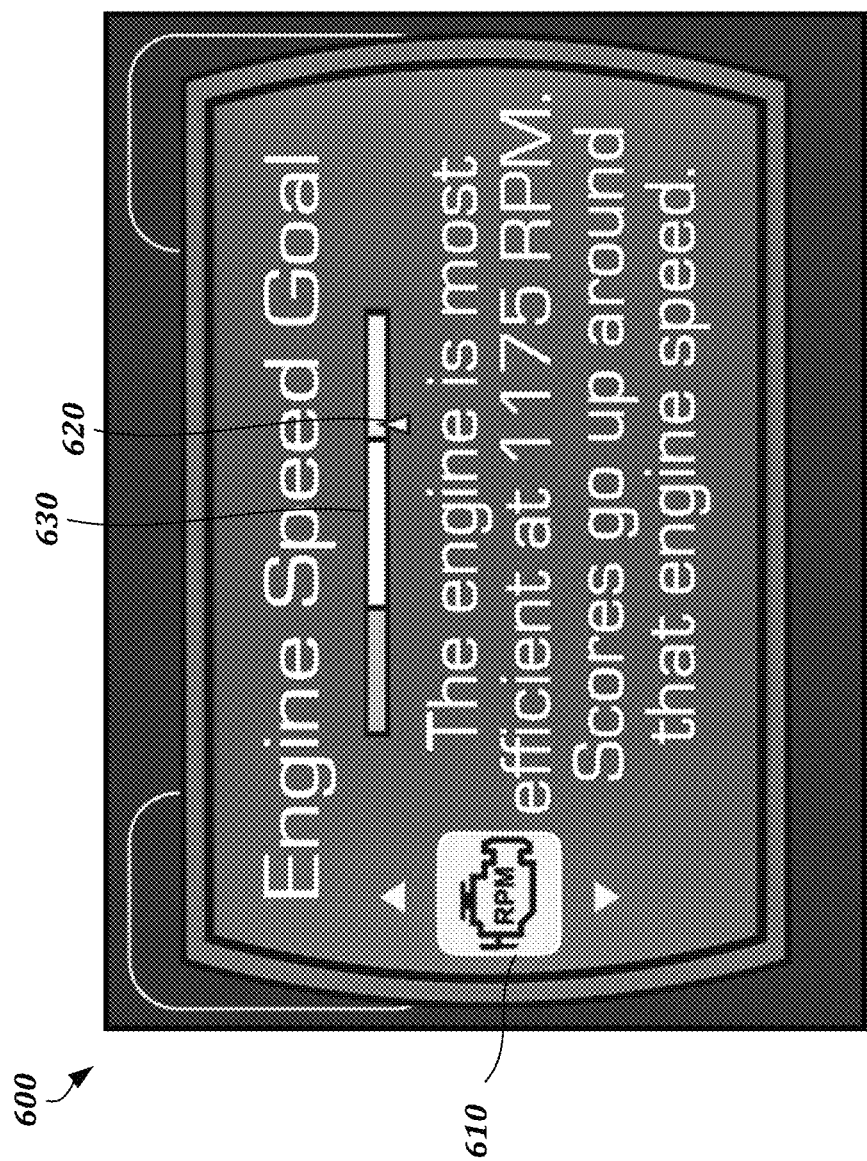
FIGS. 6 and 7 are examples of notifications that may be generated by a system such as the fuel economy performance analysis and notification system of FIG. 2 according to at least one embodiment of the present disclosure.

With regard to notifications for Engine Speed Scoring, in at least one embodiment the appearance of a notification, an icon, a displayed Engine Speed Score value, or other information can be adjusted based on a driver's performance. For example, referring to FIG. 6, features such as an icon 610 or an engine speed score indicator 620 in the notification 600 can be used to indicate relative performance relative to engine speed goals. In the example shown in FIG. 6, the engine speed score is depicted by the position of the indicator 620 in a scoring bar 630. Alternatively, the engine speed score can be omitted, or depicted in text or in some other way.

In one illustrative scenario, an icon color for Engine Speed Scoring can be in a first state (e.g., a first color, such as green) when the following conditions are true:

1. Engine Speed Score=ACTIVE; and
2. Engine speed is less than or equal to Engine Speed Goal.

Alternatively, other sets of conditions can be used.

The icon color for Engine Speed Scoring can be in a second state (e.g., a second color, such as white) when the following conditions are true:

1. Engine Speed Score=ACTIVE; and
2. Engine speed is greater than Engine Speed Goal; and
3. Engine speed is less than or equal to (Engine Speed Goal+an adjustable offset value).

This approach allows the driver to see they are operating at an engine speed above their Engine Speed Goal, but not at such a high engine speed to cause poor fuel economy performance. Alternatively, other sets of conditions can be used.

The icon can be in a third state (e.g., a third color, such as amber) when the following conditions are true:

1. Engine Speed Score=ACTIVE; and
2. Engine speed is greater than Engine Speed Goal+the adjustable offset value.

This approach allows the driver to see if the engine speed is greater than the Engine Speed Goal plus the offset value, indicating poor fuel economy performance. In at least one embodiment, if this same set of conditions has been met for a length of time, the Engine Speed Tip Count is incremented, as explained above. Alternatively, other sets of conditions can be used.

Figure 7:
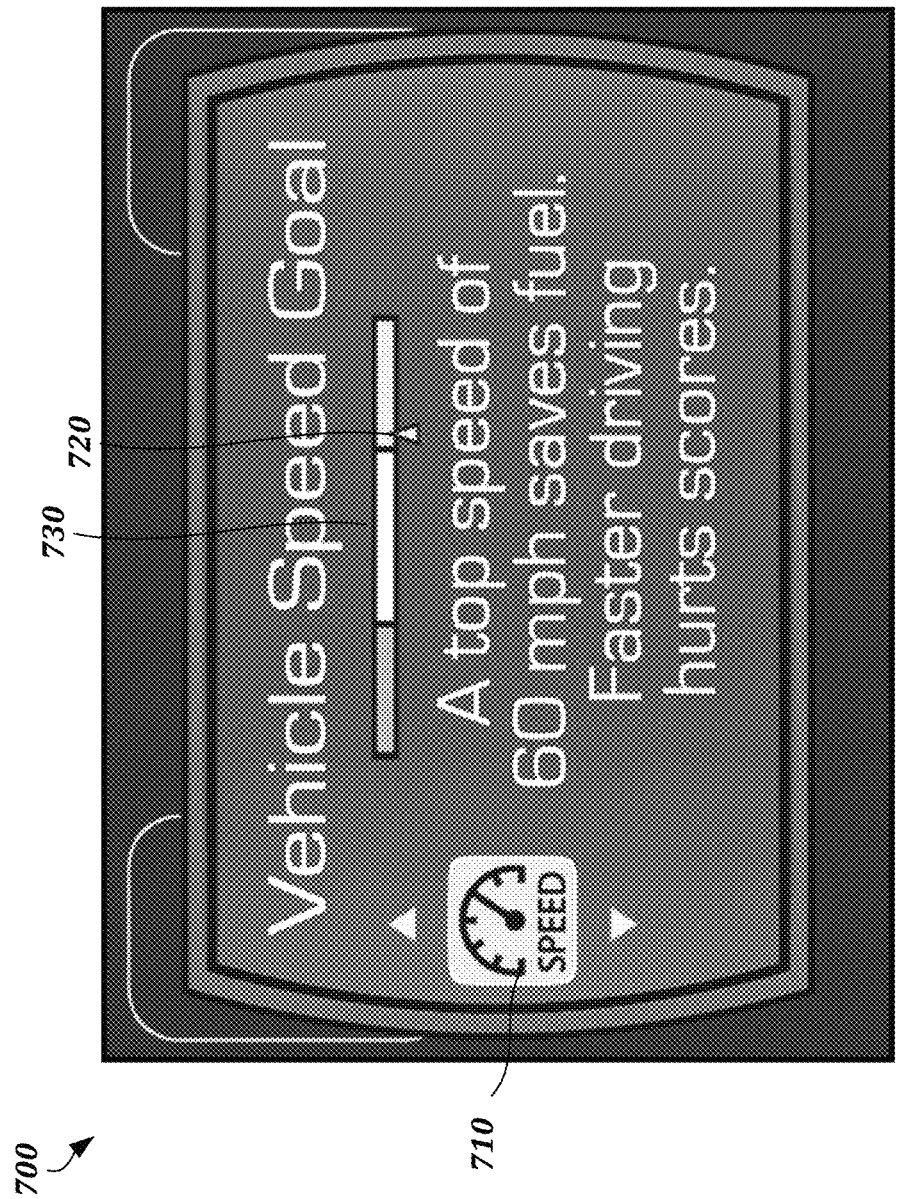

With regard to notifications for Vehicle Speed Scoring, in at least one embodiment the appearance of a notification, an icon, a displayed Vehicle Speed Score value, or other information can be adjusted based on a driver's performance. For example, referring to FIG. 7, features such as an icon 710 or a vehicle speed score indicator 720 in the notification 700 can be used to indicate relative performance relative to vehicle speed goals. In the example shown in FIG. 7, the vehicle speed score is depicted by the position of the indicator 720 in a scoring bar 730. Alternatively, the vehicle speed score can be omitted, or depicted in text or in some other way.

In one illustrative scenario, an icon for vehicle speed scoring can be in a first state (e.g., a first color, such as green) when the following conditions are true:

1. Vehicle Speed Score=ACTIVE; and
2. Actual vehicle speed is less than or equal to Vehicle Speed Goal.

Alternatively, other sets of conditions can be used.

The icon for vehicle speed scoring can be in a second state (e.g., a second color, such as white) when the following conditions are true:

1. Vehicle Speed Score=ACTIVE; and
2. Actual vehicle speed is greater than Vehicle Speed Goal; and
3. Actual vehicle speed is less than or equal to (Vehicle Speed Goal+an adjustable offset value).

This approach allows the driver to see they are operating at a vehicle speed above the Vehicle Speed Goal, but not at such a high speed to cause poor fuel economy performance. Alternatively, other sets of conditions can be used.

The icon can be in a third state (e.g., a third color, such as amber) when the following conditions are true:
 1. Vehicle Speed Score=ACTIVE; and
 2. Actual vehicle speed is greater than (Vehicle Speed Goal+the adjustable offset value).

This approach allows the driver to see if the actual vehicle speed is greater than the Vehicle Speed Goal plus the offset value, indicating poor fuel economy performance. In at least one embodiment, if this same set of conditions has been met for a predetermined length of time, the Vehicle Speed Tip Count is incremented, as explained above. Alternatively, other sets of conditions can be used.

With regard to other scoring, such as combination scoring or Throttle On Scoring, multiple icons or scores (e.g., for engine speed scoring, vehicle speed scoring, cruise control bonus) may be displayed individually (e.g., as a collection of scores or icons) or as a combination, such as an average or combined score for the combination.

Data Export and Analysis

Data collected with techniques described herein need not be used solely within an on-board vehicle computer system. For example, data can be exported (e.g., via a service tool or via wired or wireless communication with a server or other computing device or system) for analysis or other uses (e.g., for driver evaluation or training purposes) to one or more other computing devices. Examples of data that may be of interest for export or further analysis may include counts of time intervals or percentage of time spent at different vehicle speeds (e.g., in 5 mph increments or at some other level of granularity); counts of time intervals or percentage of time spent at different engine speeds (e.g., in 50 RPM increments or at some other level of granularity); and percentage of distance driven in cruise control (e.g., when Cruise Control Possible=TRUE). Other data that may be of interest for export or further analysis may include engine speed scoring, vehicle speed scoring, cruise control bonus scores, and any other data described herein.

Illustrative Methods

In this section, illustrative fuel economy performance analysis and notification methods are described. Although illustrative details are provided in this section, it should be understood that alternative methods can be implemented and used in accordance with the present disclosure.

Figure 8:
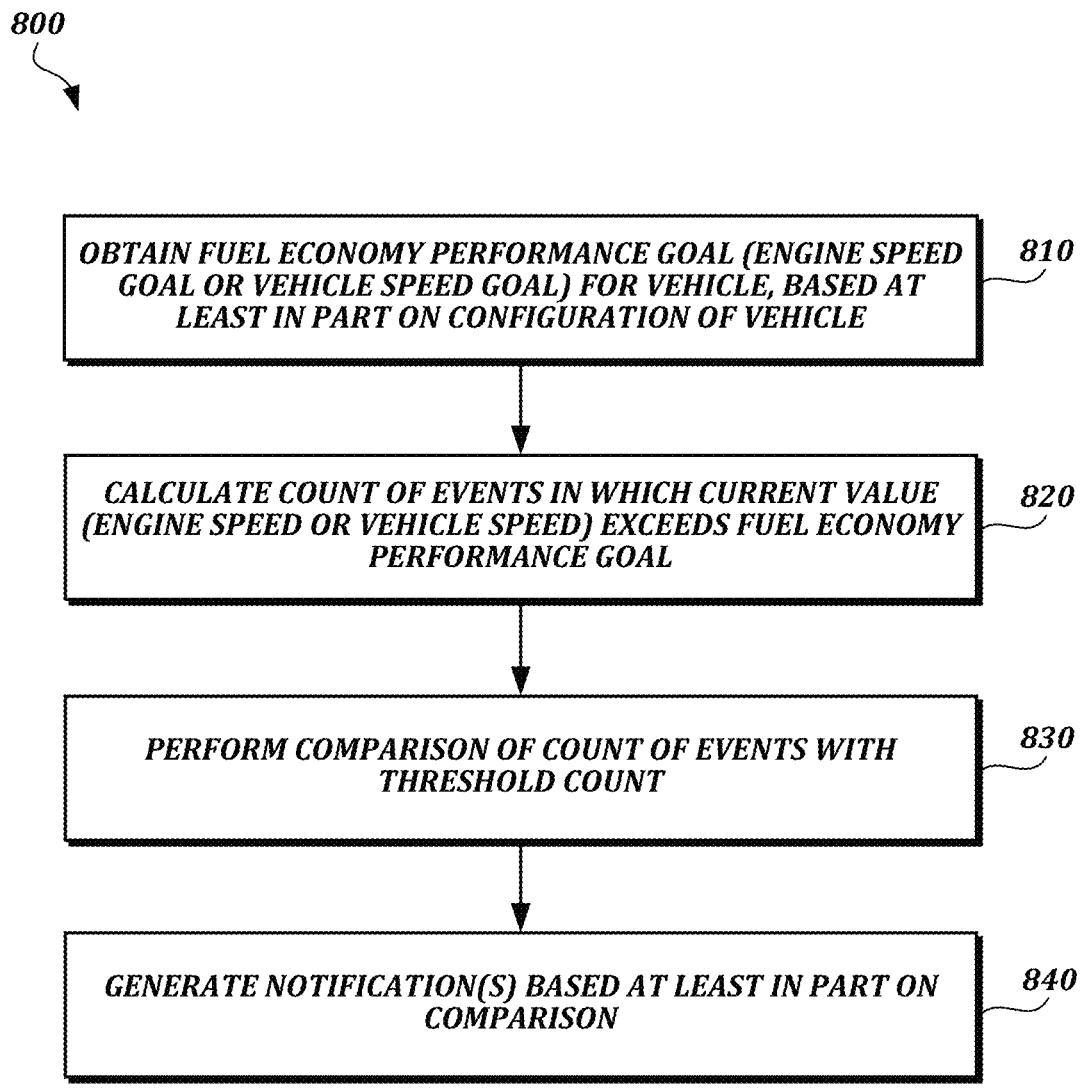
FIGS. 8 and 9 are flow charts of illustrative methods that may be implemented by a system such as the fuel economy performance analysis and notification system of FIG. 2, according to at least one embodiment of the present disclosure.

FIG. 8 is a flow diagram of an illustrative method 800 that may be performed by the fuel economy performance analysis and notification system 100 described above or by some other system, in accordance with aspects of the present disclosure. At step 810, the system obtains a fuel economy performance goal (e.g., an engine speed goal or a vehicle speed goal) for a vehicle. The fuel economy performance goal is based at least in part on a configuration of the vehicle. For example, the engine speed goal may be included in configuration information supplied to the system, and may indicate an optimal highway engine speed in terms of fuel economy for the vehicle in its present configuration. The engine speed goal may be based on a peak torque engine speed for the vehicle, drivability of the vehicle at engine speeds above the peak torque engine speed, or other characteristics of the vehicle. As another example, the vehicle speed goal may be included in configuration information supplied to the system, and may indicate an optimal highway speed in terms of fuel economy for the vehicle in its present configuration. A vehicle owner or other entity may set the vehicle speed goal based on factors such as expected use or fuel economy goals. This flexibility is valuable because a vehicle may be used in different ways (e.g., at different speeds, on different routes, hauling different loads), which may affect the vehicle speed goal for a particular customer or application.

At step 820, the system calculates a count of events (e.g., a tip count) in which a current value (e.g., engine speed or vehicle speed, respectively) exceeds the corresponding fuel economy performance goal. As noted above, a determination as to whether to increment the count may involve comparing the current value with the fuel economy performance goal plus an offset value, in order to avoid situations where the count increases even when the driver is operating the vehicle at a speed that is very close to the goal. At step 830, the system performs a comparison of the count of events with threshold count, and at step 840, the system generates one or more notifications based at least in part on the comparison.

The system may also calculate fuel economy performance scores, such as engine speed scores or vehicle speed scores, as described above. The notifications may include representations of the scores.

Figure 9:
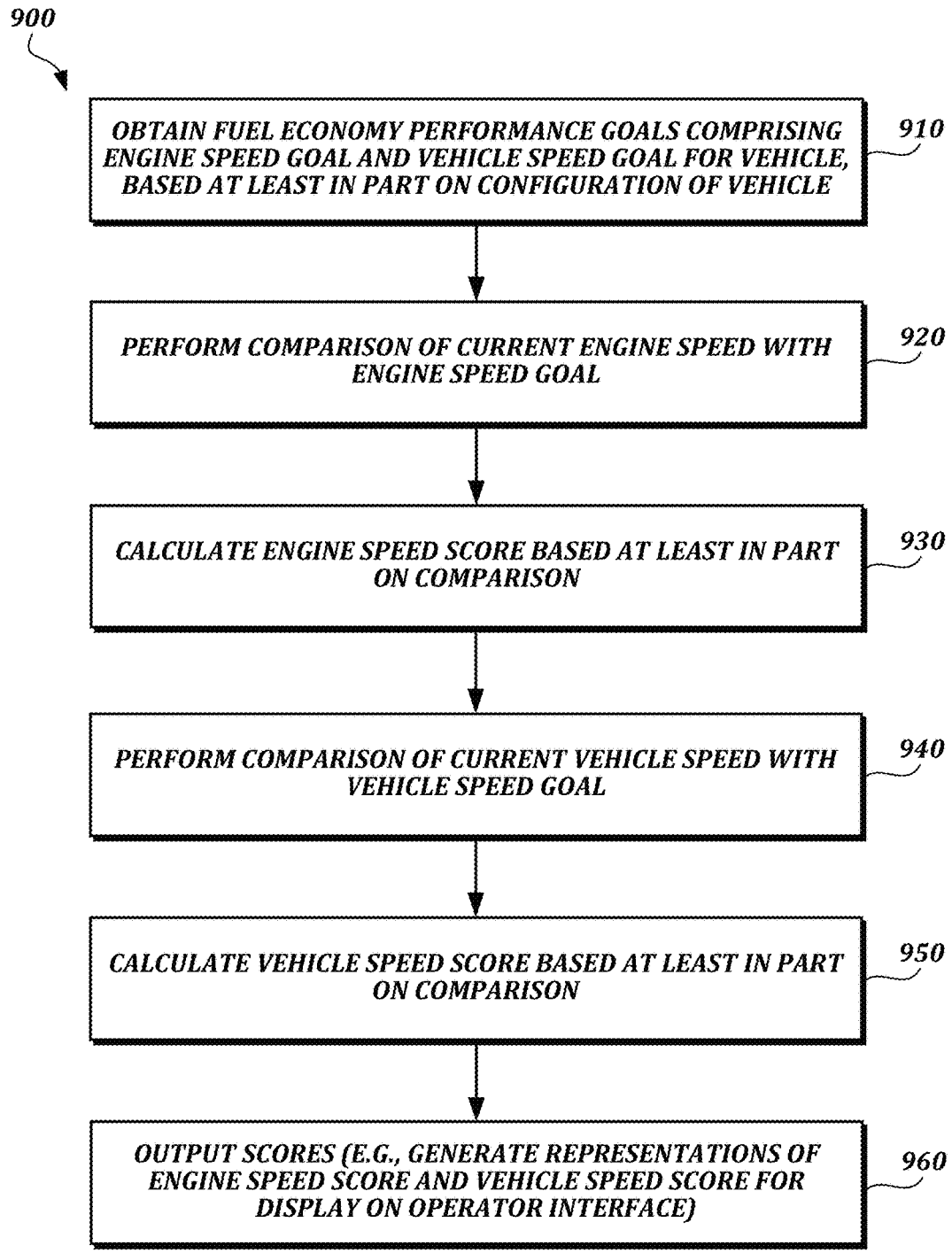

FIG. 9 is a flow diagram of another illustrative method 900 that may be performed by the fuel economy performance analysis and notification system 100 described above or by some other system, in accordance with aspects of the present disclosure. At step 910, the system obtains fuel economy performance goals including an engine speed goal and a vehicle speed goal. The fuel economy performance goals are based at least in part on a configuration of the vehicle. At step 920, the system performs a comparison of a current engine speed with the engine speed goal, and at step 930, the system calculates an engine speed score based at least in part on that comparison. Initial calculations and updates to the engine speed score can be calculated according to the examples described above, or in some other way. Similarly, at step 940 the system performs a comparison of a current vehicle speed with the vehicle speed goal, and at step 950, the system calculates a vehicle speed score based at least in part on that comparison. Initial calculations and updates to the vehicle speed score can be calculated according to the examples described above, or in some other way. At step 960, the system generates representations of the engine speed score, the vehicle speed score, or a combination of the scores (e.g., for display on an operator interface).

Extensions and Alternatives

Many alternatives to the described methods are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the vehicles and systems described herein are possible. Although illustrative details of vehicle computing systems are described with reference to FIGS. 1 and 2, it should be understood that alternative systems and methods can be implemented and used in accordance with the present disclosure. Further, it should be understood that, in practice, a fully-functional vehicle computer system may have additional components (e.g., sensors, control modules, output devices, input devices, and the like) that are not shown in FIGS. 1 and 2 for ease of illustration.

The particular signals, variables, and parameters described herein, as well as their respective possible ranges and states and the particular logic for processing them, are only examples. Depending on implementation, more or fewer or different signals, variables, and parameters may be used to achieve similar results. In any of the examples described herein, the specific signals, variables, and parameters that are described can be separated into additional signals, variables, or parameters, or combined into fewer signals, variables, or parameters.

Many alternatives to the set of notifications described herein are possible. For example, notifications described herein can be omitted, supplemented with additional notifications, or replaced with different notifications or effects. As another example, elements described herein can be omitted, supplemented with additional elements, or replaced with different elements to provide, for example, different granularity of reminders (e.g., by making reminders more abrupt or more gradual, as may be desired in different situations).

It should be understood that aspects of the systems and related processes described herein transcend any particular type of vehicle and may be applied to vehicles employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A vehicle having an on-board computer system comprising:
   an operator interface;
   at least one processing unit; and
   a memory having stored therein computer-executable instructions configured to cause the on-board computer system to:
      obtain a fuel economy performance goal for a vehicle, wherein the fuel economy performance goal is based at least in part on a configuration of the vehicle, and wherein the fuel economy performance goal is an engine speed goal or a vehicle speed goal;
      calculate a count of events in which a current value exceeds the fuel economy performance goal, wherein the current value is a current engine speed or a current vehicle speed;
      perform a comparison of the count of events with a threshold count;
      generate one or more notifications based at least in part on the comparison, wherein the one or more notifications include an indicator of driver performance relative to the fuel economy performance goal; and
      present the one or more notifications via the operator interface.

2. The vehicle of claim 1, wherein the fuel economy performance goal is an engine speed goal.

3. The vehicle of claim 2, wherein the computer-executable instructions are further configured to cause the on-board computer system to calculate an engine speed score for a driver of the vehicle.

4. The vehicle of claim 2, wherein the engine speed goal is based at least in part on a peak torque engine speed for the vehicle.

5. The vehicle of claim 1, wherein the fuel economy performance goal is a vehicle speed goal.

6. The vehicle of claim 5, wherein the computer-executable instructions are further configured to cause the on-board computer system to calculate a vehicle speed score for a driver of the vehicle.

7. A computer-implemented method performed by a computer system, wherein the computer system includes an operator interface on board a vehicle, the method comprising:
   obtaining a fuel economy performance goal for the vehicle, wherein the fuel economy performance goal is based at least in part on a configuration of the vehicle, and wherein the fuel economy performance goal is an engine speed goal or a vehicle speed goal;
   calculating a count of events in which a current value exceeds the fuel economy performance goal, wherein the current value is a current engine speed or a current vehicle speed;
   performing a comparison of the count of events with a threshold count;
   generating one or more notifications based at least in part on the comparison, wherein the one or more notifications include an indicator of driver performance relative to the fuel economy performance goal; and
   presenting the one or more notifications via the operator interface.

8. The method of claim 7, wherein the fuel economy performance goal is an engine speed goal.

9. The method of claim 8, further comprising calculating an engine speed score for a driver of the vehicle.

10. The method of claim 8, wherein the engine speed goal is based at least in part on a peak torque engine speed for the vehicle.

11. The method of claim 7, wherein the fuel economy performance goal is a vehicle speed goal.

12. The method of claim 11, further comprising calculating a vehicle speed score for a driver of the vehicle.

13. The method of claim 7, wherein the computer system comprises an on-board vehicle computer system.

14. A vehicle having an on-board computer system comprising:
   an operator interface;
   at least one processing unit; and
   a memory having stored therein computer-executable instructions configured to cause the on-board computer system to:
      obtain fuel-economy performance goals for a vehicle, wherein at least one of the fuel economy performance goals is based at least in part on a configuration of the vehicle, and wherein the fuel economy performance goals comprise an engine speed goal and a vehicle speed goal;
      perform a comparison of a current engine speed with the engine speed goal;
      calculate an engine speed score for a driver of the vehicle based at least in part on the comparison of the current engine speed with the engine speed goal;
      perform a comparison of a current vehicle speed with the vehicle speed goal;

calculate a vehicle speed score for the driver of the vehicle based at least in part on the comparison of the current vehicle speed with the vehicle speed goal; and output the engine speed score and the vehicle speed score via the operator interface.

15. The vehicle of claim 14, wherein the computer-executable instructions are further configured to cause the on-board computer system to calculate a combined score for a driver of the vehicle based at least in part on the engine speed score and the vehicle speed score.

16. The vehicle of claim 15, wherein the combined score is further based on cruise control usage.

17. The vehicle of claim 14, wherein the computer-executable instructions are further configured to cause the on-board computer system to generate a representation of the combined score for display on the operator interface.

18. The vehicle of claim 14, wherein the computer-executable instructions are further configured to cause the on-board computer system to generate representations of the engine speed score and the vehicle speed score for display on the operator interface.

\* \* \* \* \*